United States Patent Office 3,400,101
Patented Sept. 3, 1968

3,400,101
ALKOXYALKYLIDENECYCLOBUTANONES
Edward U. Elam and James C. Martin, Kingsport, Tenn., assignors to Eastman Kodak Company, Rochester, N.Y., a corporation of New Jersey
No Drawing. Filed Apr. 21, 1966, Ser. No. 544,102
8 Claims. (Cl. 260—63)

ABSTRACT OF THE DISCLOSURE

Alkoxyalkylidenecyclobutanones are prepared by the condensation of aliphatic and aromatic aldehydes with a 3-alkoxycyclobutanone. The alkoxyalkylidenecyclobutanones are useful chemicals, for example, as dyes and chemical intermediates.

DISCLOSURE

This invention relates to alkoxyalkylidenecyclobutanones of formula:

(1) 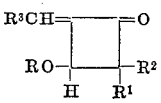

and to a method for producing them. Further, this invention relates to the polymerization products formed from these alkoxyalkylidenecyclobutanones. While alkoxy-dialkylcyclobutanones and some specific alkylidenecyclobutanones have been shown in the prior art, compounds having both alkoxy and alkylidene substituents on the cyclobutanone ring have not been previously known. Materials of Formula 1, having both alkoxy and alkylidene substituents, are prossessed of particularly useful properties.

It is one object of this invention to provide new and useful cyclobutanones having both alkoxy and alkylidene substituents.

It is a further object of this invention to provide unsaturated compounds with a cyclobutanone ring from which novel polymers can be prepared.

A further object of this invention is to provide a process for the formation of alkoxyalkylidenecyclobutanones.

According to the present invention, the alkoxyalkylidenecyclobutanones of Formula 1 are prepared by a condensation reaction represented by the equation:

(2) 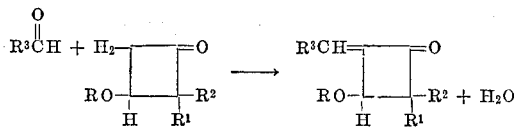

in the presence of a basic catalyst.

The substituents which R, R¹,R², and R³ can represent in Formula 1 and Equation 2 depend, in some cases, upon the reaction conditions employed. Thus, R is selected from the class consisting of alkyl groups containing from one to 20 carbon atoms and substituted alkyl groups; R¹ and R² are selected from the class consisting of hydrogen, alkyl and cycloalkyl groups containing from one to eight carbon atoms, and substituted alkyl and cycloalkyl groups, and carbocyclic rings formed by joining R¹ and R²; and R³ is selected from the class consisting of hydrogen, alkyl and aryl groups containing from 1 to 20 carbon atoms, and substituted alkyl and aryl groups. The substituted alkyl and aryl groups mentioned for R, R¹, R², and R³ involve substituents which are stable to the basic conditions of the reaction. Among these stable substituents are alkyl, aryl, alkoxy, aryloxy, hydroxy, amine, etc. Further, if R³ is an aryl group, it can be substituted with one or more halogen atoms, among other groups which are stable to the reaction conditions.

Strongly basic catalysts, such as sodium or potassium hydroxide or the corresponding alkoxides, are preferred because of the speed with which the reaction is completed in the presence of these catalysts. However, such catalysts as piperidine, piperidine acetate, trimethylbenzylammoniumhydroxide, triethylenediamine, and other similar basic materials can also be employed. Further, anion exchange resins, such as, polystyrene with quaternary amine groups, alkylene bridge cross-linked polyalkylene amines, styrene-divinylbenzene copolymers with quaternary ammonium functional groups, etc., can be employed. The exact amount of catalyst required depends, to some extent, upon the particular reactants employed. In general, with the exception of the basic anion exchange resins, the amount of catalyst should be in the range of from about 0.1% to 20%, based on the weight of the cyclobutanone employed. The preferred range for the catalyst is between 5 and 10% by weight, based upon the amount of the cyclobutanone. When anion exchange resins are utilized, they are most advantageously employed in the form of a continuous fixed bed reactor, so that the reaction between the aldehyde and the cyclobutanone is carried out continuously.

While a solvent is not essential to the reaction, various inert solvents can be employed. Among the solvents which are inert to the reactants under the conditions of reaction are ethers, such as, diethyl ether, tetrahydrofuran, etc.; hydrocarbons, such as, hexane, heptane, etc.; and other similar inert solvents. When such solvents are employed, there should be a minimum of about 10%, by weight, of total reactants based upon the weight of the solvent, to ensure efficient reaction. Obviously, more concentrated solutions can be utilized.

The condensation reaction will proceed with a 1:1 stoichiometric ratio of aldehyde to cyclobutanone. However, as the cyclobutanone is the more expensive of the two reactants, it is generally preferable to employ an excess of the aldehyde, for example, up to 2 or 3 moles of the aldehyde for each mole of the cyclobutanone employed. An even higher ratio of aldehyde to cyclobutanone can be employed, but there is little advantage in so doing. Further, the cyclobutanone can be employed in excess, and can, in fact, be used as a type of reaction solvent, but due to its expense, this is generally not desirable. Overall, the ratio of aldehyde to cyclobutanone in the reaction should range between 0.5:1 and 10:1, preferably, between 1:1 and 3:1.

The physical form of the aldehyde employed is immaterial. If the desired aldehyde is a solid, it can be dissolved in one of the previously mentioned solvents, or, as previously mentioned, can be dissolved in an excess of cyclobutanone, although this is not desirable, due to cost. Further, gaseous formaldehyde or acetaldehyde can also be employed. The order of addition of the reactants is not critical, and the reaction can advantageously be carried out by mixing the two reactants simultaneously. Of course, if a gaseous aldehyde is employed, the reaction can be conducted more advantageously by passing the aldehyde into the cyclobutanone containing the basic catalyst.

The reaction times and temperatures are dependent, to some extent, upon the reactants, catalysts, and ratios used. In general, temperatures of from about 20° C. to 150° C. are advantageously employed and reaction times from 30 minutes to 15 hours give satisfactory yields.

While, in general, any aldehyde within the scope of the previous description can be employed, it is generally preferred that there be no more than one hydrogen atom on the alpha-carbon atom. Thus, among the preferred aldehyde are formaldehyde, isobutyraldehyde, other aliphatic aldehydes having no more than one hydrogen atom on the alpha-carbon atom, and aromatic aldehydes. While aldehydes containing more than one hydrogen atom on the alpha-carbon atom, such as acetaldehyde or n-butyl aldehyde, can be employed, they have a tendency to undergo self-condensation under the reaction conditions, whereby the yield is sharply reduced.

Following reaction, the product of Formula 1 can be recovered from the reaction mixture by a variety of methods, as will be apparent to one skilled in the art. For example, depending upon the product, the reaction mixture can be extracted with an inert solvent, and the product recovered by crystallization; the reaction mixture can be acidified to neutralize the basic catalyst and the product recovered by distillation; or the product may be salted out of the reaction mixture. In the case of condensation reactions employing formaldehyde, it is frequently advantageous to acetylate the crude reaction mixture prior to distillation. The acetylation aids in stabilizing the intermediate products and preventing reversion to the starting materials. The alkoxyalkylidenecyclobutanone can be recovered from the acetate formed by pyrolysis, either by distillation or by passing over Pyrex or Vycor chips at temperatures up to 500° C.

The alkoxyalkylidenecyclobutanones of Formula 1, such as those formed by the condensation reaction of Equation 2, can be converted to vinyl polymers of formula:

(3)

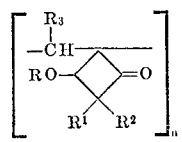

where $R^1$, $R^2$, and $R^3$ are as previously defined, and $n$ is an integral number, greater than one. These polymers have unusually high melting points for vinyl polymers and, additionally, are readily soluble in such solvents as dioxane. This makes them especially useful as components of lacquers and for cast films. The polymers of Formula 3 can be formed from the monomers of Formula 1 by the usual methods employed for vinyl polymerization. Thus, the polymers can be formed by the free-radical catalysis of the monomers of Formula 1. Among the free-radical catalysts which are usually employed for this purpose are such materials as peroxides, persulfates, and azo compounds. The monomers of Formula 1 where $R^1$ is hydrogen, that is, those alkoxyalkylidenecyclobutanones formed from formaldehyde, polymerize very readily and may even polymerize spontaneously on recovery of the product from the reaction mixture.

The following examples are given as illustrative of the present invention and should not be considered as limiting in any way the full scope as covered by the appended claims.

EXAMPLE 1

A mixture of 71 g. (0.5 mole) of 2,2-dimethyl-3-ethoxy-cyclobutane and 200 ml. of 37% Formalin (2.6 moles of formaldehyde) was placed into a reaction vessel. The mixture was stirred, heated to 67° C., and a solution containing 10 g. of sodium hydroxide in 25 ml. of water was added gradually. A sudden, exothermic reaction occurred after about one-half of the sodium hydroxide solution had been added and the reaction mixture, which had been two-pase, became homogeneous and light yellow. The temperature rose to about 100° C. Stirring was continued for about 15 minutes, following the addition of the sodium hydroxide solution. Anhydrous potassium carbonate was then added to salt out the organic layer, which was removed, acidified with acetic acid, and added slowly, with stirring, to a solution of 5 g. of zinc chloride contained in 200 ml. of acetic anhydride, in order to acetylate the reaction product. The acetylated reaction mixture was stirred for about an hour, washed with a saturated solution of sodium carbonate, and distilled. The distillation yielded, among other materials, a product fraction boiling at from 67° to 70° C. at 3 mm.

which condensed to a mobile liquid having a sharp odor. The liquid rapidly became viscous and finally solidified, on standing. An infrared spectrum of the material, freshly distilled prior to becoming viscous, showed a strong band at 5.65 microns characteristic of the carbonyl group in a cyclobutanone ring, and a band at 6 microns, indicative of the presence of olefinic unsaturation. Following solidification, the polymer was purified by dissolving it in dioxane, and pouring the dioxane solution into methanol. An infrared spectrum of the purified polymer showed strong bands at 5.65 microns and 8.9 microns, indicating that the alkoxycyclobutanone ring was still intact and that the polymer had the approximate average formula:

(4)

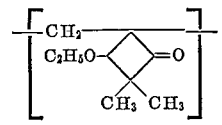

where $n$ is greater than one, corresponding to Formula 3 where R is ethyl, $R^1$ and $R^2$ are methyl, and $R^3$ is hydrogen. The structure was further confirmed by an elemental analysis which showed 69.6% carbon and 9.2% hydrogen, corresponding favorably with the theoretical percentages of 70.1% carbon and 9.1% hydrogen. The polymer melted at about 205–215° C. and had an inherent viscosity, measured in a phenol-tetrachloroethane mixture, of 2.0.

Tough, flexible films were cast from dioxane solutions of the polymer. Additionally, when dioxane solutions of the polymer of Formula 4 were extruded into methanol, long threads were formed.

EXAMPLE 2

A mixture of 128 g. (1 mole) of 2,2-dimethyl-3-methoxycyclobutanone and 197 g. (2.7 moles) of isobutyraldehyde was placed in a reaction vessel equipped with a stirrer, reflex condenser, and thermometer. The mixture was stirred and treated with 66 ml. of a 20% sodium hydroxide solution. The temperature rose spontaneously to about 80° C. and, after the exothermic reaction had subsided, the mixture was stirred and refluxed for five additional hours. The mixture was then acidified with dilute sulfuric acid and the organic layer which separated was distilled giving, after the removal of low boilers, 109 g. of crude product boiling at 74°–105° C. at 5.5 mm. The reaction can be represented by the equation:

(5)

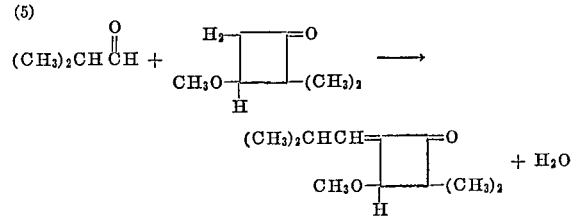

corresponding to Equation 2 where R, $R^1$, and $R^2$ are methyl and $R^3$ is isopropyl. The crude product was redistilled giving 50 g. the isomeric mixture of cis- and trans - 2,2 - dimethyl - 4 - isobutylidene-3-methoxycyclobutanone boiling at from 82° to 90° C. at 7.0–7.8 mm.

EXAMPLE 3

Employing conditions similar to those described in Example 2, the following reaction was carried out:

(6)

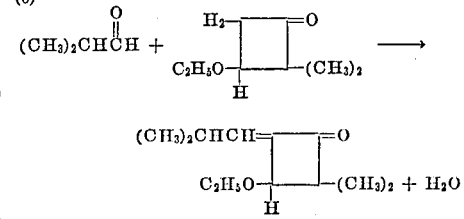

corresponding to Equation 2 where R is ethyl, R¹ and R² are methyl, and R³ is isopropyl. Distillation of the product gave the isomeric mixture of 2,2-dimethyl-3-ethoxy-4-isobutylidenecyclobutanone which had a boiling point of 83°–90° C. at 5.5 mm. and a refractive index $n_D^{20}$ 1.4558–1.4570. An elemental analysis of the product showed 73.0% carbon and 10.5% hydrogen, corresponding favorably with the theoretical percentages of 73.4% carbon and 10.2% hydrogen. Infrared and nuclear magnetic resonance spectra confirmed that the distillation product had the structure of the product of Equation 6.

Employing the general equipment, conditions, and steps of Examples 1–3, the condensation reactions indicated in Examples 4 through 15 were carried out:

EXAMPLE 4

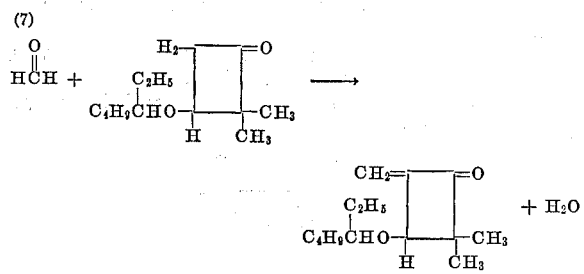

EXAMPLE 5

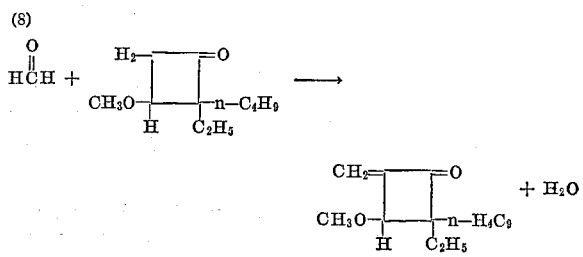

EXAMPLE 6

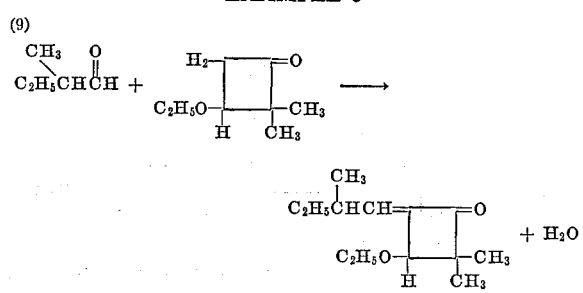

EXAMPLE 7

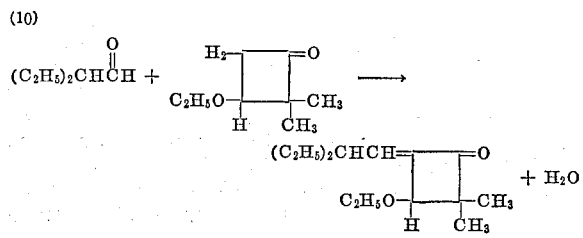

EXAMPLE 8

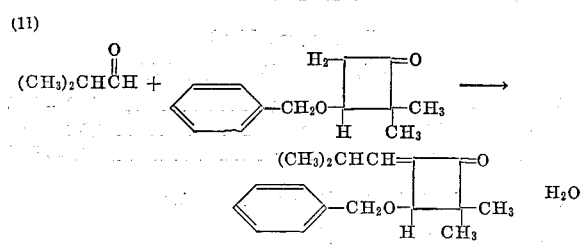

EXAMPLE 9

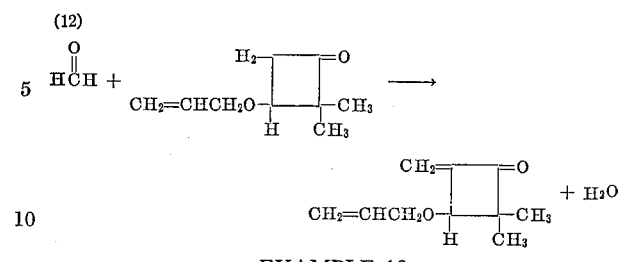

EXAMPLE 10

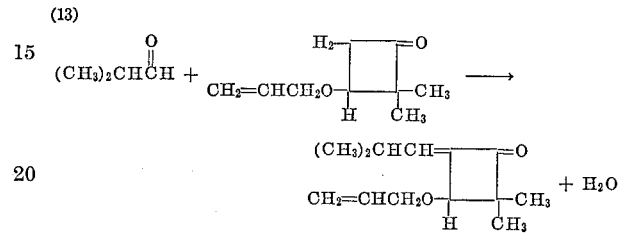

EXAMPLE 11

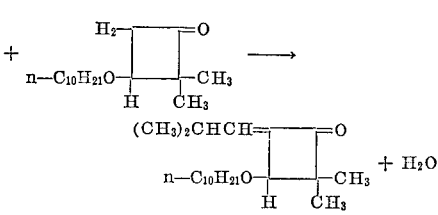

EXAMPLE 12

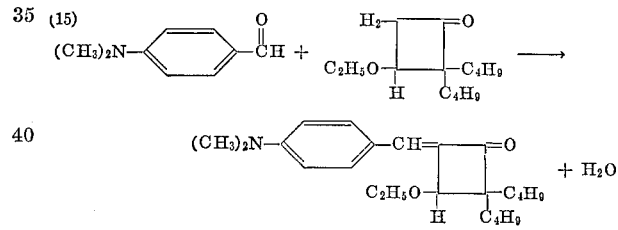

EXAMPLE 13

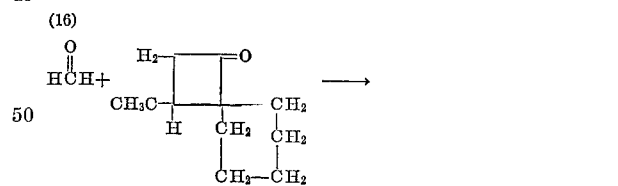

EXAMPLE 14

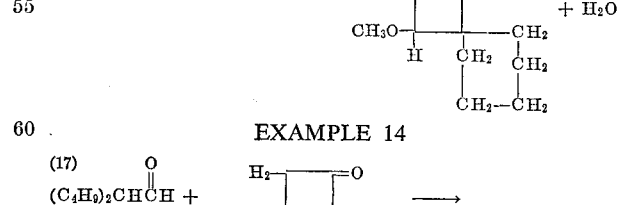

EXAMPLE 15

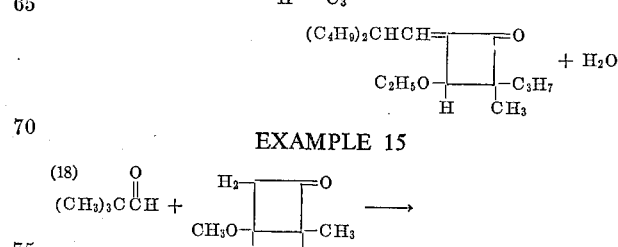

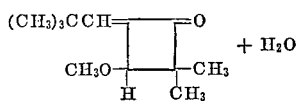

EXAMPLE 16

A mixture of 29.8 g. (0.2 mole) of p-dimethylaminobenzaldehyde, 28 g. (0.2 mole) of 3-ethoxy-2,2-dimethylcyclobutanone, and 15 ml. of a 20% sodium hydroxide solution were placed in a reaction vessel equipped as in Example 2. With stirring, the mixture was heated on a steam bath for five hours in order to carry out the following condensation reaction:

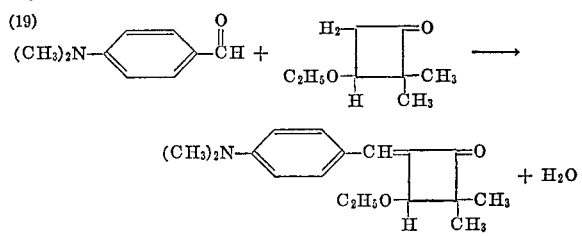

corresponding to the reaction of Equation 2 where R is ethyl, $R^1$ and $R^2$ are methyl, and $R^3$ is p-dimethylaminophenylene. Following the five hour heating period, the reaction mixture was diluted with 300 ml. benzene, and the organic layer separated and dried over anhydrous magnesium sulfate. The dried organic layer was distilled and yielded, in addition to some unchanged p-dimethylaminobenzaldehyde, 16.5 g. of 3-ethoxy-2,2-dimethyl-4[p-(dimethylamino)benzylidene] cyclobutanone with a boiling point of 186°–190° C. at 0.6 mm. An element analysis of the purified product showed 74.7% carbon, 8.9% hydrogen, and 5.3% nitrogen, corresponding favorably with theoretical percentages for the product of the reaction of Equation 19 of 74.7% carbon, 8.4% hydrogen, and 5.1% nitrogen.

EXAMPLE 17

The 3-ethoxy-2,2-dimethyl-4-[p-(dimethylamino)benzylidene] cyclobutanone produced in Example 16 was applied to swatches of cloth. Four swatches were used, one of a cellulose acetate material, marketed under the trade name "Estron" by Eastman Chemical Products, Inc., a modacrylic, marketed under the trade name "Verel" by Eastman, a polyester fiber swatch, marketed under the trademark "Kodel" by Eastman, and a nylon polyamide swatch. Each of the swatches was dyed bright yellow, the yellow of the cellulose acetate swatch being especially deep.

In addition to the use of certain of the monomers of Formula 1 as dyes, as just mentioned, it has been previously noted that the monomers can be converted to vinyl polymers possessing certain advantageous properties. Additionally, the ketonic oxygen of each of the monomers of Formula 1 can be reduced to an alcohol, employing conventional means, to yield a product having the formula:

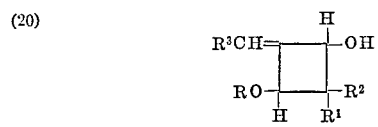

where R, $R^1$, $R^2$, and $R^3$ are as previously defined. The material of Formula 20 can then be reacted with a dicarboxylic acid, such as phthalic acid, to produce diesters which are useful, e.g., as plasticizers for poly(vinylhalide) or cellulose ester resins.

Although the invention has been described in considerable detail with particular reference to certain preferred embodiments thereof, variations and modifications can be effected within the spirit and scope of the invention as described hereinbefore and as defined in the appended claims.

What is claimed is:

1. An alkoxyalkylidenecyclobutanone of the formula

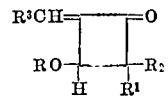

where R is selected from the class consisting of alkyl groups having from one to 20 carbon atoms and benzyl; $R^1$ and $R^2$ are selected from the class consisting of hydrogen, alkyl and cycloalkyl radicals having from one to eight carbon atoms, and carbocyclic rings formed by joining $R^1$ and $R^2$; and $R^3$ is selected from the class consisting of hydrogen, alkyl and aryl groups having from 1 to 20 carbon atoms or dimethylaminophenylene.

2. The alkoxyalkylidenecyclobutanone of claim 1 wherein $R^3$ is hydrogen.

3. The alkoxyalkylidenecyclobutanone of claim 1 wherein $R^3$ is dimethylaminophenylene.

4. A [polymeric material] polymer consisting of recurring units of the formula:

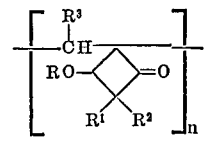

where R is selected from the class consisting of alkyl groups having from one to 20 carbon atoms and benzyl; $R^1$ and $R^2$ are selected from the class consisting of hydrogen, alkyl and cycloalkyl groups having from one to eight carbon atoms, and carbocyclic rings formed by joining $R^1$ and $R^2$; and $R^3$ is selected from the class consisting of hydrogen, alkyl and aryl groups having from 1 to 20 carbon atoms or dimethylaminophenylene and $n$ is an integer greater than 1.

5. The polymer of claim 4 wherein $R^3$ is hydrogen.

6. A method for producing alkoxyalkylidinecyclobutanones of the formula:

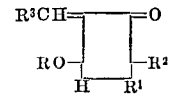

which comprises condensing an aldehyde with a 3-alkoxycyclobutanone according to the equation:

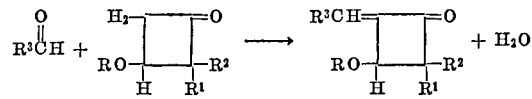

in the presence of from about 0.1 to about 20 weight percent of a basic catalyst at from about 20° to about 150° C.; where R is selected from the class consisting of alkyl groups having from 1 to 20 carbon atoms and benzyl; $R^1$ and $R^2$ are selected from the class consisting of hydrogen, alkyl and cycloalkyl groups having from one to eight carbon atoms, and carbocyclic rings formed by joining $R^1$ and $R^2$; and $R^3$ is selected from the class consisting of hydrogen, alkyl, and aryl groups having from 1 to 20 carbon atoms or dimethylaminophenylene.

7. The method of claim 6 wherein the aldehyde has no more than one hydrogen substituent on the alpha-carbon atom.

8. The method of claim 6 wherein $R^3$ is hydrogen.

References Cited

UNITED STATES PATENTS

| | | | |
|---|---|---|---|
| 3,256,334 | 6/1966 | Scheidt | 260—586 |
| 3,288,854 | 11/1966 | Martin | 260—586 |
| 3,312,741 | 4/1967 | Martin | 260—586 |

WILLIAM H. SHORT, *Primary Examiner.*

L. LEE, *Assistant Examiner.*

UNITED STATES PATENT OFFICE
CERTIFICATE OF CORRECTION

Patent No. 3,400,101                          September 3, 1968

Edward U. Elam et al.

It is certified that error appears in the above identified patent and that said Letters Patent are hereby corrected as shown below:

Column 5, formula (8) should appear as shown below:

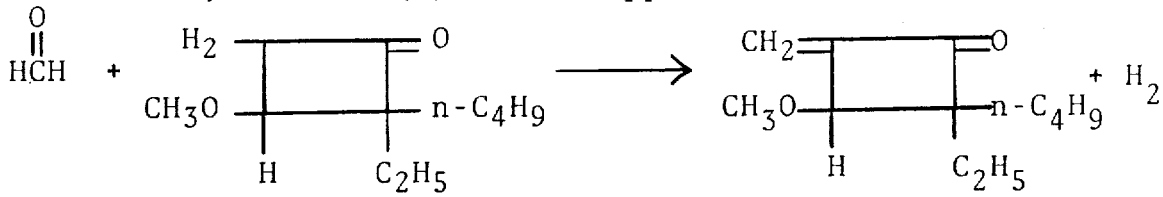

same column 5, formula (11) should appear as shown below:

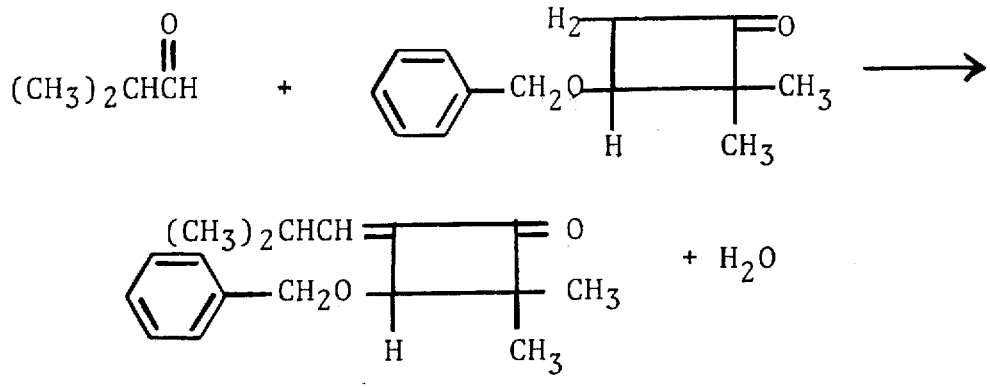

Column 6, formula (16) should appear as shown below:

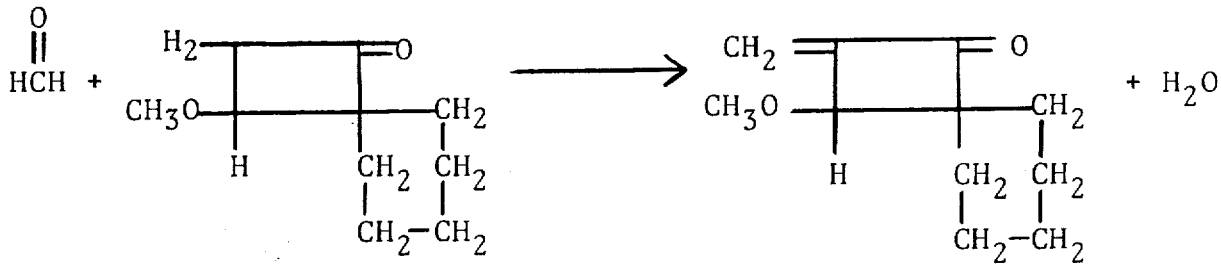

(2)

same column 6, formula (17) should appear as shown below:

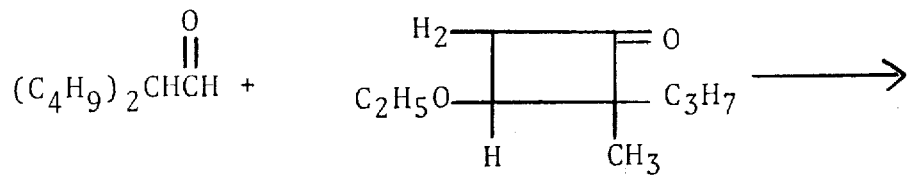

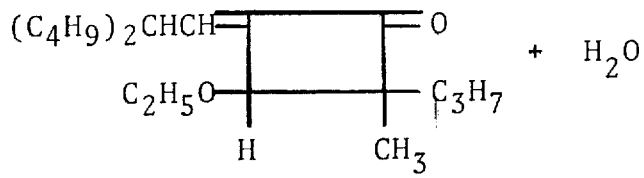

Column 8, lines 3 to 7, the formula should appear as shown below:

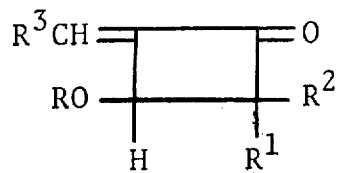

same column 8, line 20, cancel "[polymeric material]".

Signed and sealed this 10th day of March 1970.

(SEAL)
Attest:

EDWARD M. FLETCHER, JR.  
Attesting Officer

WILLIAM E. SCHUYLER, JR.  
Commissioner of Patents